US012576440B2

(12) United States Patent (10) Patent No.: US 12,576,440 B2

Castellucci (45) Date of Patent: Mar. 17, 2026

(54) SHEET MATERIAL FORMING

(71) Applicant: HADLEY INDUSTRIES OVERSEAS HOLDINGS LTD., Birmingham (GB)

(72) Inventor: Michael Castellucci, Birmingham (GB)

(73) Assignee: HADLEY INDUSTRIES OVERSEAS HOLDINGS LTD., Birmingham (GB)

( * ) Notice: Subject to any disclaimer, the term of this patent is extended or adjusted under 35 U.S.C. 154(b) by 0 days.

(21) Appl. No.: 18/645,661

(22) Filed: Apr. 25, 2024

(65) Prior Publication Data

US 2024/0293858 A1 Sep. 5, 2024

Related U.S. Application Data

(63) Continuation of application No. 17/700,986, filed on Mar. 22, 2022, now Pat. No. 12,030,099, which is a
(Continued)

(30) Foreign Application Priority Data

Sep. 5, 2014 (GB) ...................................... 1415748

(51) Int. Cl.
| | |
|---|---|
| *B21D 11/20* | (2006.01) |
| *B21D 13/00* | (2006.01) |
| *B21D 37/02* | (2006.01) |
| *B32B 3/30* | (2006.01) |
| *B32B 15/01* | (2006.01) |
(Continued)

(52) U.S. Cl.
CPC .............. *B21D 11/20* (2013.01); *B21D 13/00* (2013.01); *B21D 37/02* (2013.01); *B32B 3/30* (2013.01); *B32B 15/01* (2013.01); *B44B*

*5/0047* (2013.01); *B44B 5/026* (2013.01); *Y10T 428/12389* (2015.01)

(58) Field of Classification Search
CPC ........... B21D 13/00; B32B 15/01; B32B 3/30; Y10T 428/12389
USPC ........................................................ 428/600
See application file for complete search history.

(56) References Cited

U.S. PATENT DOCUMENTS

| | | |
|---|---|---|
| 2,059,292 A | 11/1936 | Taylor |
| 2,639,660 A | 5/1953 | Sunderhauf et al. |
(Continued)

FOREIGN PATENT DOCUMENTS

| | | |
|---|---|---|
| AU | 672927 B | 4/1995 |
| CN | 1964826 A | 5/2007 |
(Continued)

OTHER PUBLICATIONS

International Search Report from corresponding PCT/GB2015/052577 dated Feb. 17, 2016.
(Continued)

*Primary Examiner* — Katherine A Christy

(74) *Attorney, Agent, or Firm* — Caesar Rivise, PC

(57) ABSTRACT

A formed sheet metal material and methods, tools and apparatus for forming the sheet metal material in which a pattern of projections and depressions are cold worked in a first portion and, simultaneously, indicia is embossed in a second portion of the sheet material. The cold worked portion is formed with the projections and depressions configured and distributed such that lines drawn on a surface of the formed sheet material between adjacent rows of projections and depressions are not rectilinear. The indicia is indicative of the alignment between the tools.

21 Claims, 6 Drawing Sheets

Related U.S. Application Data continuation of application No. 15/508,678, filed as application No. PCT/GB2015/052577 on Sep. 7, 2015, now Pat. No. 11,311,923.

(51) Int. Cl.
*B44B 5/00*  (2006.01)
*B44B 5/02*  (2006.01)

(56) References Cited

U.S. PATENT DOCUMENTS

| | | | |
|---|---|---|---|
| 2,969,586 | A | 1/1961 | Victor |
| 3,465,384 | A | 9/1969 | Barchi et al. |
| 3,706,627 | A | 12/1972 | Arne |
| 4,027,517 | A | 6/1977 | Bodnar |
| 4,130,974 | A | 12/1978 | Chalmers et al. |
| 4,876,837 | A | 10/1989 | Kelly et al. |
| 4,962,622 | A | 10/1990 | Albrecht et al. |
| 5,699,932 | A | 12/1997 | Claydon et al. |
| 5,941,109 | A | 8/1999 | Johnson et al. |
| 5,983,692 | A | 11/1999 | Bruck |
| 8,573,012 | B1 | 11/2013 | Paulson |
| 8,997,543 | B2 | 4/2015 | Therrien |
| 2004/0149142 | A1 | 8/2004 | Groll |
| 2005/0181182 | A1 | 8/2005 | Heath |
| 2007/0193324 | A1 | 8/2007 | Mitsukawa et al. |
| 2008/0060405 | A1 | 3/2008 | Ball et al. |
| 2008/0134912 | A1 | 6/2008 | Golan |
| 2009/0188399 | A1 | 7/2009 | Uratani |
| 2012/0000264 | A1 | 1/2012 | Deeley et al. |
| 2015/0273547 | A1 | 10/2015 | Wilhelm et al. |

FOREIGN PATENT DOCUMENTS

| | | |
|---|---|---|
| EP | 1714784 A2 | 10/2006 |
| GB | 1352568 A | 5/1974 |
| GB | 1513644 A | 6/1978 |
| GB | 2272662 A | 5/1994 |
| GB | 2276350 A | 9/1994 |
| GB | 2385816 B | 7/2004 |
| GB | 2450765 A | 1/2009 |
| RU | 2162414 C2 | 1/2001 |
| RU | 2220803 C2 | 1/2004 |
| RU | 2254194 C1 | 6/2005 |
| RU | 2448795 C2 | 4/2012 |
| WO | 97/35674 A1 | 10/1997 |
| WO | 9803280 A1 | 1/1998 |
| WO | 2005115655 A2 | 12/2005 |
| WO | 2006058424 A1 | 6/2006 |
| WO | 2009/063154 A1 | 5/2009 |
| WO | 2009143981 A1 | 12/2009 |
| WO | 2014066918 A1 | 5/2014 |

OTHER PUBLICATIONS

Search Report from related GB 1415748.1 dated Feb. 19, 2015.
Search Report from related GB 1415748.1 dated Aug. 27, 2015.
Examination Report from related GB 1719485.3 dated Dec. 13, 2017.
Examination Report from related NZ 730121 dated Sep. 25, 2017.
Examination Report from related GB 1716413.8 dated Oct. 24, 2017.
Russian Search Report for Application No. 2020104803 dated Jun. 29, 2023.
English Translation for Russian Search Report for Application No. 2020104803 dated Jun. 29, 2023.

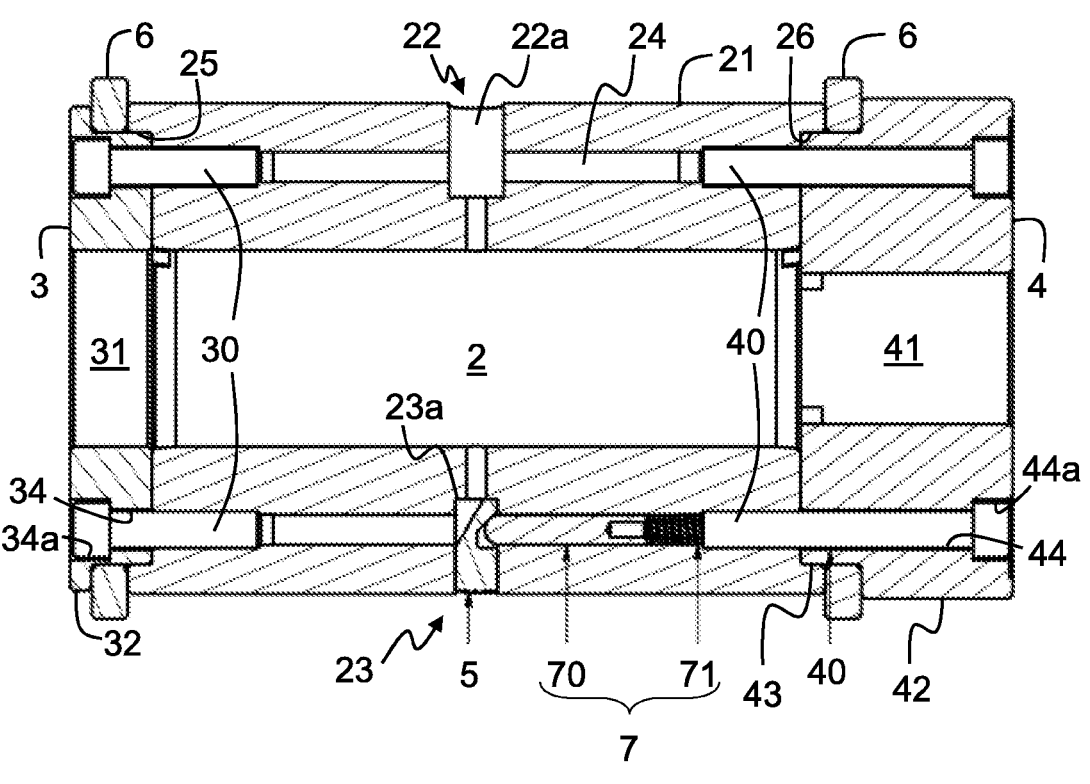
FIGURE 3
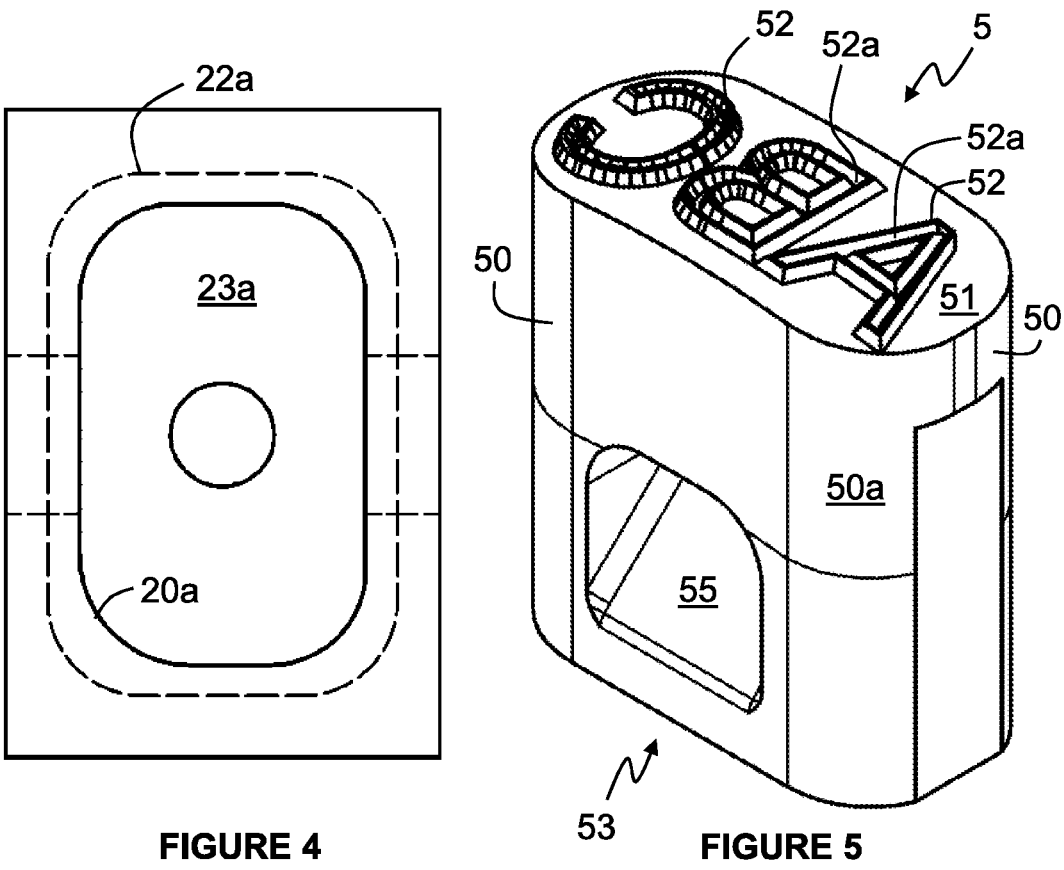
FIGURE 4          FIGURE 5

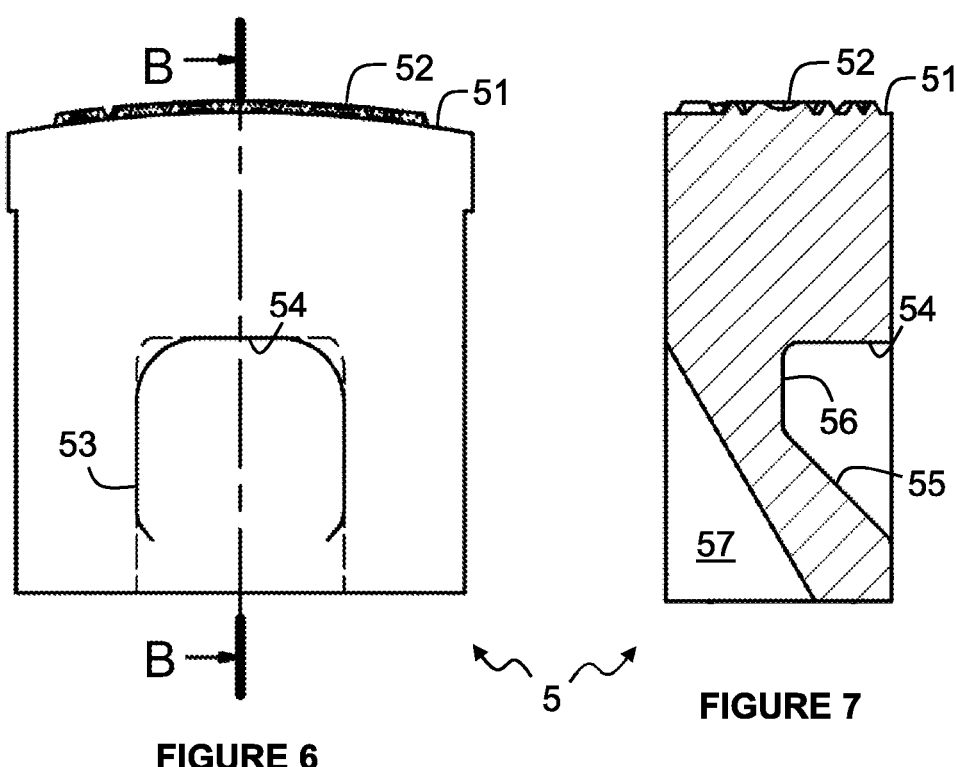
FIGURE 6
FIGURE 7
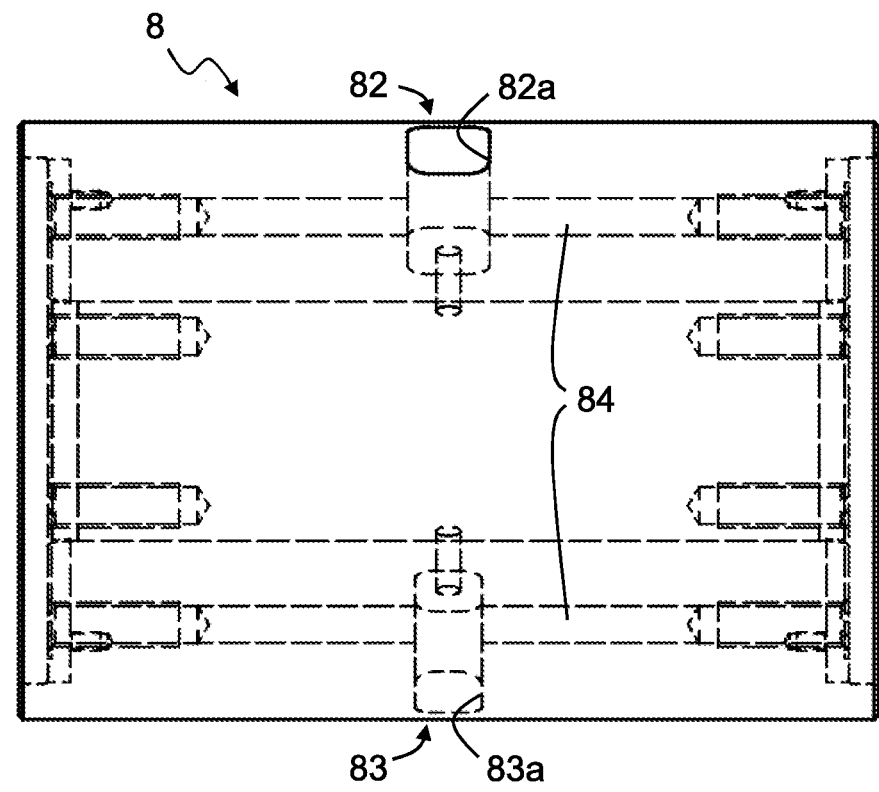
FIGURE 8

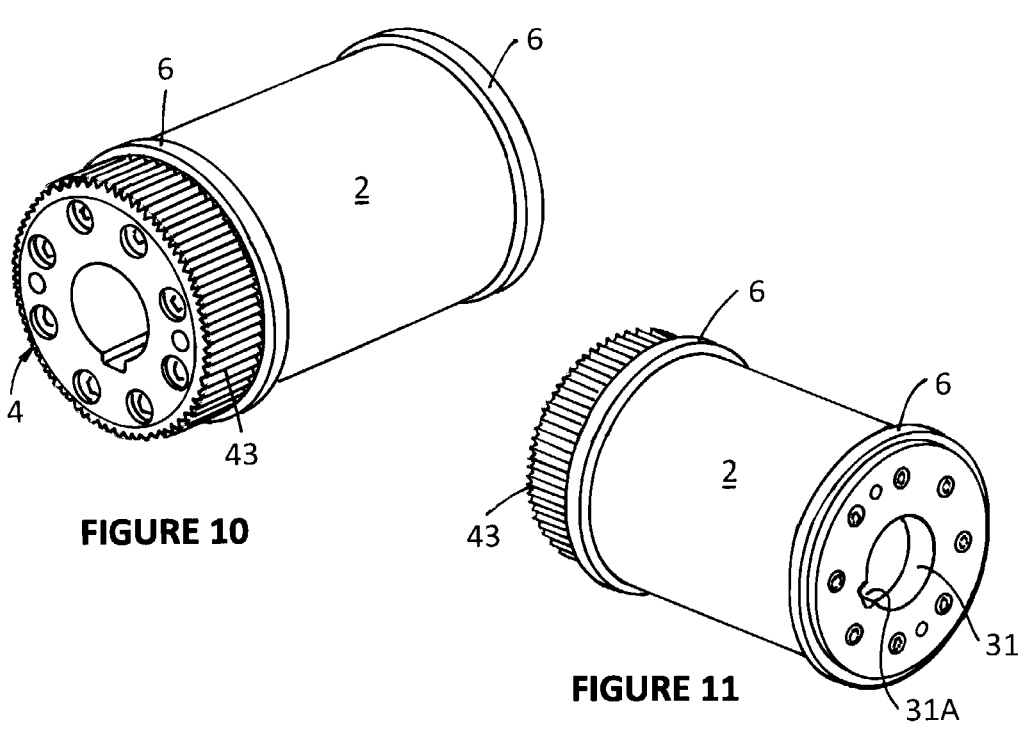
FIGURE 10
FIGURE 11
TOOL DATUM ALIGNMENT
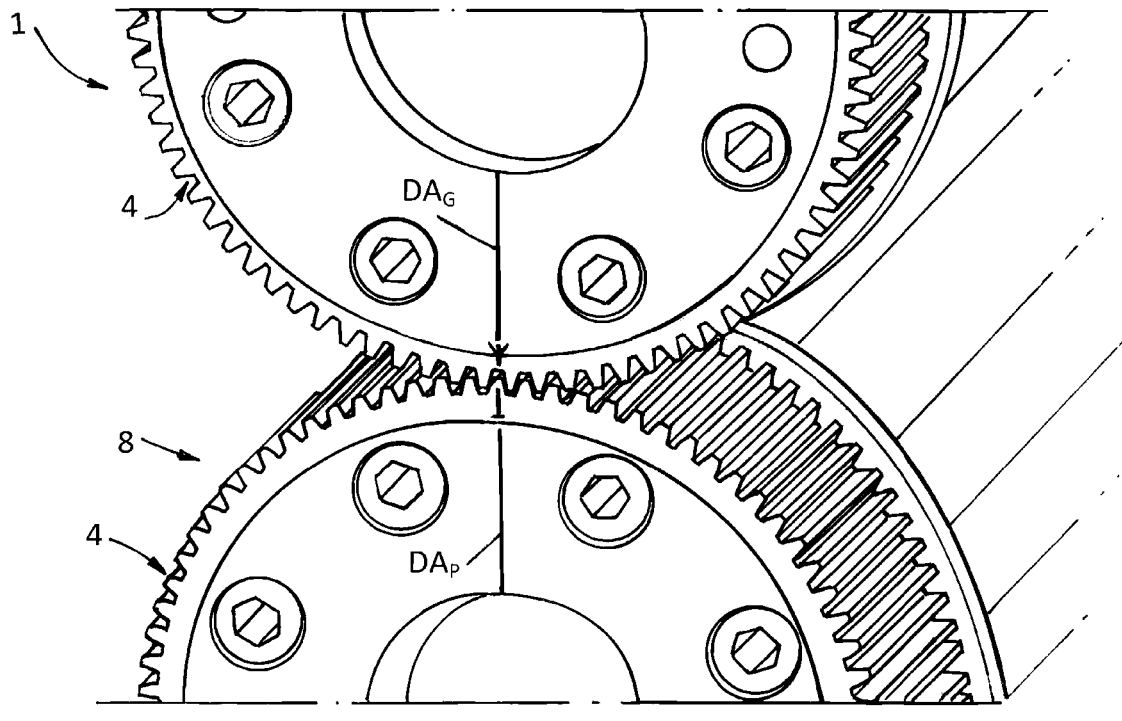
FIGURE 12

SHEET MATERIAL FORMING

CROSS-REFERENCE TO RELATED APPLICATIONS

This continuation application claims the benefit under 35 U.S.C. § 120 of application Ser. No. 17/700,986 filed on Mar. 22, 2022, which claims the benefit under 35 U.S.C. § 120 of application Ser. No. 15/508,678 filed on Mar. 3, 2017, now U.S. Pat. No. 11,311,923, which in turn is a U.S. National Phase Application and claims the benefit under 35 U.S.C. § 371 of PCT/GB2015/052577, filed Sep. 7, 2015, which claims priority from GB 1415748.1, filed Sep. 5, 2014, the contents of which applications are incorporated herein by reference in their entireties for all purposes.

BACKGROUND OF THE INVENTION

1. Field of Invention

This invention relates generally to sheet material forming and more particularly to tools and methods for forming sheet material and to formed sheet material. More specifically, although not exclusively, this invention relates to methods and tools for cold forming one or more projections and/or depressions on one or more surfaces of a sheet material and to a sheet material so formed.

Several methods of forming sheet material with projections are known, many of which involve passing the sheet material between opposed tools to form one or more projections on the sheet. Some exemplary sheet forming methods include roll forming, such as cold roll forming, stamping and pressing, such as punching using a machine press or stamping press, blanking, embossing, bending, flanging, knurling or coining.

2. Description of Related Art

The present invention is particularly, although not exclusively, concerned with cold rolling, which is a process of shaping materials by passing a sheet material between a pair of rollers whilst at a temperature below its recrystallization temperature, usually at room temperature. As the material passes between the rollers, it is strengthened by a process known as strain hardening.

Cold rolling is usually performed on sheet material, fed from a coil of material. The sheet material is passed between a series of matched pairs of rollers to successively shape the sheet material until it has the desired configuration, for example, a C, U or box section. The shaped sheet material (hereinafter a section) may then be cut to the desired length.

Typically, the sheet material may be metal, for example steel, aluminium, copper, brass, silver, gold, titanium and so on, although plastics and other materials may be cold rolled. Steel is most usually processed. The material may be coated (e.g. galvanized) or uncoated Proper alignment and indexing of the opposed tools can also be critical, particularly where densely packed projections and/or complex geometries are involved. As a result of the high forces exerted by the tools in any of these operations, but particularly in cold forming processes, the tools have a tendency to move out of alignment with one another. Regular and careful inspection of the formed sheet material is often required in order to ensure proper alignment of the tools.

As will be further appreciated, it is essential to ensure that the rolls are aligned during the start-up process, when the rolls are driven from rest to or toward their operating rotational speed, to ensure accurate registration and to prevent damage and so on.

WO2009/063154, the contents of which are incorporated herein by reference, discloses methods and tools for forming a sheet of material to provide on both of its surfaces rows of projections and rows of depressions, wherein the relative positions of the projections and depressions are such that lines drawn on a surface of the sheet between adjacent rows of projections are non-rectilinear. The process described leads to work hardening of the sheet material. Each projection is formed to have a substantially continuous region of peak plastic strain about its apex with material thinning of 25% or less. Proper tool alignment in this case is crucial to achieve the requisite balance between work hardening and material thinning. Even minor tool misalignment can have an impact, and sometimes a significant impact, upon the formed material, but detection of such minor misalignment can be difficult.

The performance of sheet material that is cold roll formed with projections is therefore highly dependent upon the quality of manufacture. It is therefore desirable to have some means of establishing reliably the quality of manufacture and/or the provenance of such formed sheet material.

It is therefore a non-exclusive object of the invention to provide a means by which tool alignment and/or provenance can be monitored more simply and/or effectively. It is a further, more general non-exclusive object of the invention to provide an improved sheet forming tool and method that at least mitigates the issues with known forming tools and methods.

BRIEF SUMMARY OF THE INVENTION

According to a first aspect of the invention, there is provided a method of forming a sheet material, the method comprising the steps of placing or running a sheet material between a pair of tools and moving the tools such that the tools, e.g. respective first forming surfaces thereof, form a pattern in a first portion of the sheet material and such that the tools, e.g. respective second forming surfaces thereof, form indicia or a second pattern that is or may be different from the first pattern in a second portion of the sheet material, e.g. wherein the indicia or second pattern may be indicative of the alignment between the tools.

The pattern may be formed by any forming method, such as cold roll forming, stamping and pressing, blanking, embossing, bending, flanging, knurling or coining or any other suitable forming method, but the pattern is preferably formed by cold working. The indicia or second pattern may also be formed by any suitable forming method, such as cold roll forming, stamping and pressing, blanking, embossing, bending, flanging, knurling or coining or any other suitable forming method. The indicia or second pattern is preferably formed by embossing. More preferably, the indicia or second pattern is formed by embossing the sheet material such that the indicia or second pattern protrudes out of the plane of the sheet material, for example a neutral plane thereof.

According to a second aspect of the invention, there is provided a method of forming a sheet material, the method comprising the steps of placing or running a sheet material between a pair of tools and moving the tools such that the tools, e.g. respective first forming surfaces thereof, cold work a first portion of the sheet material and such that the tools, e.g. respective second forming surfaces thereof, emboss a second portion of the sheet material. The embossment preferably comprises indicia and/or protrudes out of the plane of the sheet material, for example a neutral plane thereof.

By forming both indicia (and/or the or a second pattern) and the pattern, for example by including forming surfaces that emboss the sheet material in or on a cold forming tool, the invention enables a simple and effective means of monitoring tool alignment by relatively unskilled persons. The inclusion of indicia or second pattern also enables product identification and/or provenance indicia for tracking and/or branding purposes to be provided during the forming operation, rather than in a separate post-forming step which would increase complexity and cost. Thus, the invention provides a convenient means of ensuring both traceability, e.g. retrospective traceability, and trackability, e.g. the ability to track products through the supply chain. Indeed, the indicia can incorporate one or more anti-counterfeiting features.

For the avoidance of doubt and as would be appreciated by the skilled person, the term 'cold working' (also known as 'cold work hardening') as used herein refers to the deformation of metal plastically at a temperature below its lowest recrystallisation temperature, where strain hardening occurs as a result of such permanent deformation. In addition, the term 'embossing' as used herein refers to the operation of raising a design or form above and/or below the surface of a component by means of high pressure effected by pressing or squeezing action, and includes debossing.

It is known that embossing and cold work hardening are distinct techniques. Embossing involves compressing material, in this case sheet metal, between two tools (e.g. rolls) to reduce its thickness beyond its ultimate tensile strength into the purely plastic range; it is a compression process which uses significant force to squeeze the material between two tools (e.g. rolls), one of which has a projection (or rebate) and the other has a rebate (or projection) whereby the pattern on the tool (e.g. roll) is transferred to the material. In contrast, work hardening by cold roll forming involves plastic strain hardening a material by locally stretching the material without compression. It is conveniently achieved in our patent applications GB2450765A, EP0891234A (the entire contents of which are incorporated herein) by using pairs of matched male forming rolls with the teeth of one of the rolls extending (as the rolls rotate) into gaps between teeth on the other roll. Clearly, the skilled person knows and recognises that the techniques of embossing and work hardening are distinct and generate different effects.

Knurling is also a known cold working process that is distinct from cold working and embossing. Knurling is a process in which a series of sharp serrations on a hardened steel roller are pressed into the material being knurled. Knurling is used to make a gripping or non-slip surface and involves displacing the material sideways using serrations or projections, rather than pushing projections through the other side of the sheet.

For the avoidance of doubt, any of the features described herein apply equally to any aspect of the invention.

The embossing or the forming of indicia or a second pattern may be simultaneous with the cold working or the forming of at least a portion of the pattern and/or the embossing or indicia or second pattern may be at least partially surrounded or encircled or bound or confined by the pattern. The pattern may comprise one or more interruptions and/or the indicia or second pattern may be formed in or at one or more or each of the interruptions. The second portion may comprise or be located at or in the one or more interruptions.

The forming of the pattern may comprise forming projections in or on one or both major surfaces of the sheet material. The forming of a projection in or on a major surface may comprise or result in a depression, e.g. a corresponding depression, being formed in or on the other major surface. The pattern formed may be such that, e.g. configured and/or distributed such that, lines drawn on a surface of the formed sheet material between adjacent rows of projections and depressions are not rectilinear.

The method is preferably continuous or at least partially continuous, for example the forming of the sheet material is preferably continuous or at least partially continuous or carried out continuously for at least a predetermined period of time. The placing or running of the sheet material between the pair of tools and/or the moving the tools and/or the forming of the pattern and/or indicia may be carried out continuously, for example using rollers or roll forming tools.

The tools may be moved such that teeth or projections on one tool urge portions of the sheet material into gaps between teeth or projections on the other tool, e.g. thereby to cold work a first portion of the sheet material and form a pattern therein or thereon. Preferably, the separation of the tools and/or the gaps are configured and/or sized and/or dimensioned such that the sheet material is cold worked, for example plastic strain hardened, by locally stretching the material and/or allowing it to flow freely, e.g. without compression or restraint or pinching.

The embossing or the forming of indicia or a second pattern may comprise forming indicia or a second pattern that is indicative of the alignment between the tools. The tools may be moved such that one or more forming edges of one of the tools forces or compresses the sheet material against the other tool, e.g. thereby embossing the sheet material to form indicia or a second pattern therein or thereon.

Additionally or alternatively, the embossing or the forming of indicia or a second pattern may comprise forming a small or microscopic indicia or pattern, e.g. that is visible only under magnification, for example using a magnifying glass or microscope.

The method may further comprise shaping the formed sheet material, for example into a profile or beam or article having a shaped cross-section, such as a channel section.

A third aspect of the invention provides a forming tool for forming sheet material, e.g. for use in a method according to any preceding claim, the forming tool comprising a first forming surface, which may be configured to form a pattern and/or cold work, in use, a sheet material or a first portion thereof, and a second forming surface, which may be configured to form indicia or a second pattern that may be different from the first pattern and/or emboss the sheet material or a second portion thereof.

The first forming surface may be configured to form, in use, a pattern of projections. The second forming surface may be configured to form, in use, indicia at an interruption in the pattern of projections.

The first forming surface may comprise a profiled forming surface, which may comprise or incorporate or define at least part of a pattern. Additionally or alternatively, the second forming surface may comprise a profiled forming surface, which may comprise or incorporate or define, at least in part, indicia or a second pattern. In some embodiments, the second forming surface of the tool is surrounded or encircled or bound or confined by the first forming surface thereof, e.g. such that the indicia or second pattern formed, in use, is surrounded or encircled or bound or confined by the pattern, for example the first forming surface or pattern may comprise one or more interruptions wherein the second forming surface or indicia or second pattern may be comprised or formed in or at one or more or each of the interruptions. The second forming surface may be bound in first and second directions, for example wherein the first and second directions are orthogonal to one another.

Additionally or alternatively, the second forming surface or the indicia or second pattern may comprise a small or microscopic indicia or pattern, e.g. that is visible only under magnification, for example using a magnifying glass or microscope.

Preferably, the forming tool comprises a substrate or drum or roll or be substantially cylindrical, for example comprising or with the first forming surface, e.g. included or incorporated thereon or therein. Additionally or alternatively, the forming tool may comprise an insert, for example comprising or with the second forming surface, e.g. included or incorporated thereon or therein. The insert may be received and/or receivable, e.g. removably received and/or receivable, within a recess or depression or hole or aperture of the forming tool. In some embodiments, the insert is secured or securable, e.g. releasably secured or securable, to the tool, for example within the recess or depression or hole or aperture thereof, such as by a locking means. The insert may be located or positioned such that the first and second forming surfaces are substantially contiguous and/or adjacent one another and/or such that the second forming surface is surrounded or encircled or bound or confined by the first forming surface or included in or at one or more interruptions in the first forming surface, e.g. for forming, in use and/or simultaneously, at least a portion of the pattern and the indicia or second pattern in or on a sheet material. The second forming surface may be surrounded or bound or encircled or confined by the first forming portion or portions in an axial direction or a direction along the axis of rotation of the tool and/or in a circumferential direction or rolling or working direction. The second forming surface, e.g. the insert, may be surrounded or bound or encircled or confined by portions of the first forming surface on each side, e.g. each axial side and/or each circumferential side. Preferably, the second forming surface is surrounded or bound or encircled or confined in the axial and/or rolling directions, more preferably both.

A fourth aspect of the invention provides a forming tool for forming sheet material, e.g. for use in a method as described above, the tool comprising a substrate, an insert and locking means, the substrate having a first forming surface, which may be profiled, incorporating a pattern, the insert having a second forming surface, which may be profiled, incorporating indicia or a second pattern, wherein the substrate comprises a recess within which the insert is removably received and/or receivable and secured and/or securable by the locking means such that the first and second forming surfaces are substantially adjacent and/or contiguous one another for forming, in use and/or simultaneously, at least a portion of the pattern and the indicia or second pattern in or on a sheet material.

The indicia or second pattern may be configured to enable, or comprise a predetermined pattern configured to enable detection, e.g. rapid and/or simplified detection, of misalignment between the tools. In some embodiments, the second forming surfaces is configured to form indicia or a second pattern that is distorted if the tools are misaligned. Additionally or alternatively, the indicia or second pattern may be machine readable and/or indicative of the alignment between the tool and another, e.g. opposed, tool.

With a complex forming pattern, such as that set out in our earlier patent application WO2009/063154 (or GB2450765A or EP0891234A), it can be difficult to determine proper registration visually. However, with certain indicia or second patterns proper alignment can be determined immediately and effectively by even untrained operatives.

The forming tool may comprise a cold forming tool, e.g. for cold forming a sheet material. Additionally or alternatively, the forming tool may comprise a roll or roller with a circumference, for example wherein the first and/or second forming surface(s) is or are provided on the circumference of the roll or roller. The tool may comprise a cylindrical roll, for example which is rotatable about its axis. Preferably, the forming tool comprises a cold roll former, e.g. for cold roll forming a sheet material, such as a sheet metal material, for example an iron based metal material such as steel or any other metallic material, or a sheet material formed of any other material, such as a plastics material.

The indicia or second pattern may comprise an identification means or identifier, such as alphanumeric indicia, one or more names or logos or images or bar codes or quick response (QR) codes. The identification means may comprise a unique identifier relating to the tool or a pair of tools or a forming machine or a manufacturer, e.g. a sheet forming manufacturer and/or tool manufacturer.

The first forming surface may comprise one or more, for example two or more, e.g. three, four or more, such as a plurality and/or an array, of projections or forming projections or teeth, which may project from a first base or root surface or diameter. The array of projections may comprise a plurality of rows and/or columns, e.g. rectilinear and/or helical rows and/or columns, of projections.

The second forming surface may comprise a stamp or one or more projections, e.g. indicia projections or second pattern projections or stamp projections, which may project from a second base or root surface or diameter. The second forming surface or the stamp or projection or projections thereof may be at or located at or in an interruption of the plurality or array of projections or forming projections or teeth of the first forming surface. The second forming surface or the stamp or projection or projections thereof may be recessed with respect to the first forming surface and/or with respect to at least one of the projection or projections or tooth or teeth thereof, e.g. the apex or apexes of the projection or projections or tooth or teeth.

In some embodiments, the second base or root surface or diameter is recessed with respect to the first base or root surface or diameter. Additionally or alternatively, at least a portion or one, preferably all, of the stamp or projection or projections of the second forming surface may be recessed with respect to at least one of the projection or projections or tooth or teeth of the first forming surface, e.g. the apex or apexes thereof. Additionally or alternatively, at least a portion or one of the stamp or projection or projections of the second forming surface may comprise a small or microscopic stamp or projection or projections or indicia or pattern, e.g. that is visible only using a magnifying glass or microscope. In some embodiments, the stamp or projection or projections of the second forming surface is surrounded or encircled or bound or confined by the projection or projections or tooth or teeth of the first forming surface and/or included in or at one or more interruptions therein or thereof.

The locking means may comprise a lock or locking mechanism. The locking means may, for example, comprise cooperating features or locking features in or on or connected to or associated with each of the insert and the recess or forming tool or substrate or drum or roll. The cooperating features may comprise a locking recess and a locking projection or member or pin or ball, e.g. for engaging the locking recess. The cooperating features may be operable between locked and unlocked conditions, for example wherein the insert is secured within the recess by the locking means when the cooperating features are in the locked condition and/or wherein the insert is removable from the recess when the cooperating features are in the unlocked condition.

The locking projection or member or pin or ball may be movable, e.g. between a deployed and undeployed or retracted position or condition and/or between a locked and unlocked position or condition. The locking recess may comprise an engaging or bearing surface, for example a tapered or slanted or sloped engaging or bearing surface, which may be at an angle or be oriented or orientated or extend at an angle, e.g. a non-orthogonal and/or non-parallel and/or acute or oblique angle, with respect to the direction of movement of the locking projection or member or pin or ball. The locking projection or member or pin or ball may be resiliently biased toward the deployed or locked position or condition. In other embodiments, the locking projection or member or pin or ball may be resiliently biased toward the undeployed or retracted or unlocked position or condition, for example by a resilient means or a biasing means or a resilient biasing means, such as a spring, e.g. a compression spring.

In one preferred embodiment, the insert comprises the locking recess and the locking projection or member or pin or ball is mounted, e.g. movably mounted, to or otherwise associated with, e.g. movably associated with, the recess or forming tool or substrate or drum or roll. The locking projection or member or pin or ball and/or the resilient means or biasing means or resilient biasing means may be received within a cavity or recess or depression or aperture or hole, which may be in or located or positioned in or associated with the tool recess or forming tool or substrate or drum or roll. Additionally or alternatively, the locking projection or member or pin or ball and/or the resilient means or biasing means or resilient biasing means may abut and/or be retained or secured or held in place, e.g. within the cavity or recess or depression or aperture or hole, by a fastener, such as a bolt.

The tool may have a first end and a second end, for example with driving means being located at or toward one of the first and second end and/or the other end being free of driving means. The tool may further comprise an aperture for receiving a shaft.

Other aspects of the invention provide an insert for use in a tool as described above and/or a tool or tool substrate or drum or roll for use in a forming tool as described above and/or a kit of parts for assembly into a tool or pair of tools as described above. The insert and/or tool or tool substrate or drum or roll and/or kit of parts may include any one or more components or features described above that would be advantageous and/or desirable, as would be clear to the skilled person.

A further aspect of the invention provides a pair of forming tools for forming sheet material therebetween, e.g. for use in a method as described above, wherein a first of the forming tools may comprise a forming tool as described above, e.g. with respect to the third or fourth aspects of the invention.

A yet further aspect of the invention provides a pair of forming tools for forming sheet material, e.g. for use in a method as described above, each forming tool comprising a first forming surface and a second forming surface, wherein the first forming surfaces of the forming tools may be configured to cooperate, in use, to cold work a sheet material therebetween and the second forming surfaces of the forming tools may be configured to cooperate to emboss the sheet material therebetween, for example such that the embossed feature or features protrude out of the plane of the sheet material, for example a neutral plane thereof.

For the avoidance of doubt, each of the opposed forming tools described in relation to any relevant aspect of the invention may comprise any one or more features described in respect of the other or another forming tool or tools.

A second of the forming tools may comprise a first forming surface for cooperating, in use, with the first forming surface of the first tool to form a pattern. Additionally or alternatively, the or a second of the forming tools may comprise a featureless surface, wherein the second forming surface of the first forming tool comprises a profiled forming surface that cooperates, in use, with the featureless surface to form indicia or a second pattern on a sheet material formed therebetween. In another embodiment, the or a second of the forming tools comprises a second profiled forming surface, wherein the second forming surface of the first forming tool cooperates, in use, with the second surface of the second forming tool to form indicia or a second pattern on a sheet material formed therebetween. The second profiled forming surfaces may cooperate to form indicia or a second pattern that is distorted if the tools are misaligned. Additionally or alternatively, the second forming surfaces may cooperate to form indicia or a second pattern at least a portion of which may comprise a small or microscopic indicia or pattern, e.g. that is visible only using a magnifying or looking glass or microscope. In some embodiments, the second forming surface of the second forming tool is surrounded or encircled or bound or confined by the first forming surface thereof or included in or at interruptions thereof or therein, e.g. such that the indicia or second pattern formed, in use, is surrounded or encircled or bound or confined by the pattern.

Another aspect of the invention provides a pair of forming tools for forming sheet material therebetween, e.g. one or each of which may comprise a forming tool as described above, each of the forming tools comprising a respective first forming surface and a respective second forming surface, wherein the first forming surfaces cooperate, in use, to form a pattern while the second forming surfaces cooperate to form, e.g. simultaneously, indicia or a second pattern, which may be distorted if the tools are misaligned.

The second forming surfaces may cooperate, in use, to form indicia or a second pattern that is visibly distorted if the tools are misaligned, for example wherein the distortion is readily detectable by the human eye. In some embodiments, at least a portion of the indicia or second pattern may be small or microscopic, e.g. visible only using a magnifying glass or microscope, and/or machine readable, for example by scanning using a scanning means or scanner. The indicia or second pattern may be configured such that tool misalignment or identification can be detected or the extent of tool misalignment can be determined by reading or scanning the indicia or second pattern, for example using a scanning means or scanner, and/or by processing the read or scanned indicia or second pattern using a processing means or algorithm or computer. One non-limiting example of such indicia or second pattern could be a bar code or quick response (QR) code. In some embodiments, the second forming surface of one or each tool is surrounded or encircled or bound or confined by the first forming surface thereof, e.g. such that the indicia or second pattern formed, in use, is surrounded or encircled or bound or confined by the pattern and/or included in or at one or more interruptions therein or thereof.

The first forming surfaces may cooperate, in use, to form a pattern comprising one or more projections and/or depressions, which may be arranged in an array and/or may be formed, in use, on one, preferably both, major surfaces of a sheet material, for example thereby defining an effective thickness or amplitude, e.g. defined between the peaks of the projections on each side of the sheet material. The pattern may comprise a plurality of rows and/or columns, e.g. rectilinear and/or helical rows and/or columns, of projections and/or depressions. The pattern or array may be configured and/or distributed such that lines drawn on a surface of the formed sheet material between adjacent rows of projections and depressions are not rectilinear. The second forming surfaces may cooperate to form the indicia at an interruption in the pattern of projections.

Preferably, the second forming surfaces comprise cooperating forming edges, which may be separated by a predetermined distance, in use, when a sheet material is formed between the tools and/or when the tools are in proper alignment. In some embodiments, one of the second forming surfaces comprises a male forming surface or projection and the other of the second forming surfaces comprises a corresponding female forming surface or projection or depression, which depression may be formed in the or a base or root surface or diameter and/or may be defined or delineated by one or more projections that may be offset with respect to the male forming surface or projection. Cooperation of the male forming surface or projection and the female forming surface or depression may be such that a predetermined degree of misalignment results in a visual indication of distortion.

The tools may comprise first and second tools, which may be operable to pattern a sheet material in use. Each tool preferably has a first end and a second end with driving means located at or toward one of the first and second ends, the other end preferably being free of driving means, e.g. which driving means in use, may intermesh, for example to allow the tools to be driven.

Yet another aspect of the invention provides an apparatus for forming sheet material, the apparatus comprising a pair of opposed tools, e.g. as described above. The tools are preferably movable relative to one another, which tools may each comprise or be provided with forming surfaces, e.g. forming projections or teeth that may be configured or able to intermesh with forming projections or teeth on the other tool. In embodiments where the apparatus comprises a pair of opposed tools as described above, the first forming surfaces may comprise projections or teeth and the geometry and/or position of the projections or teeth and/or the spacing of the tools is such that the projections or teeth on one tool register and/or extend, in use, into gaps between the projections or teeth on the other tool.

Another aspect of the invention provides an apparatus for forming sheet material, e.g. a cold rolling apparatus, the apparatus comprising first and second tools, each being provided with forming projections which are able to intermesh with forming projections on the other, the tools being operable to pattern a sheet material in use, each tool having a first end and a second end and each having driving means located at or toward one of the first and second end the other end being free of driving means, the driving means in use, intermeshing to allow the tools to be driven.

Each of the first and second tool may comprise an aperture for receiving a shaft.

Yet another aspect of the invention provides a forming tool for forming sheet material, for example for use in an apparatus as described above, e.g. a tool for cold rolling, the tool being provided with forming projections which are able to intermesh with forming projections on another tool to pattern a sheet material in use, the tool having a first end and a second end, driving means being located at or toward one of the first and second end the other end being free of driving means.

The tool may comprise an aperture for receiving a shaft.

It has been surprisingly found that rather than introducing a potential destabilising force when driving the rolls, having driving means at one end of the rolls rather than both does not have a deleterious effect on registration accuracy and continuing alignment of the patterned sheet material and also reduces the cost of the roll and associated drive means (motors, gear chains etc.) and the setup up time.

The driving means preferably comprise gears, for example spur gears.

In embodiments where the tool comprises a cylindrical shape, the peaks of the projections or teeth may define a nominal tooth-peak diameter $d_{TP}$ (e.g. that being the nominal diameter of the roll at circumference defined by the peaks of the teeth) in the circumferential direction.

The spur gears preferably have an outside diameter do.

Preferably, the ratios of the tooth-peak diameter, $d_{TP}$ to the outside diameter do is in the range of 0.5 to 1.5, say, 0.6 to 1.4, 0.7 to 1.3, 0.8 to 1.2, 0.9 to 1.1, for example from 0.91, 0.92, 0.93, 0.94, 0.95, 0.96, 0.97, 0.98, 0.99 to 1.1, 1.09, 1.08, 1.07, 1.06, 1.05, 1.04, 1.03, 1.02, 1.01 and most preferably 1.0.

Preferably, the spur gears have a pressure angle of between 16 and 30°, say between 18 and 27°, for example between 19 and 26°. Pressure angles of 20° and/or 25° may be used, or angles therebetween.

The pitch circle diameter ($D_{PCD}$) of the spur gear is preferably calculated according to the following formula $$D_{PCD} = d_{TP} - (g + k) \tag{1}$$

Where g is the gauge of the material to be processed
    k is a constant, selected to lie within the range from 0.01 to 0.5, say from 0.02, 0.03, 0.04, 0.05, 0.06, 0.07, 0.08, 0.09 to 0.45, 0.40, 0.35, 0.30, 0.25, 0.2, 0.15, for example 0.05 to 0.15, say 0.06, 0.07, 0.08, 0.09 to 0.14, 0.13, 0.12, 0.11, most preferably k is 0.1
    The number of teeth (N) required for a particular spur gear can then be calculated from the module m, as follows:

$$D_{PCD} = (N + 2) \times m \tag{2}$$

The Diametrical Pitch (P), can then be calculated, viz:

$$P = N/D_{PCD} \tag{3}$$

The tooth thickness, addendum (A) and dedendum (D) of the teeth of the spur gear can then be calculated depending on the pressure angle.

It has been surprisingly found that matching the pitch circle diameter $D_{PCD}$ to $d_{TP}$, within the above-identified relationship, has the effect of reducing damage to the spur gear during use.

At least one of the tools may comprise a body portion which carries on its periphery the forming projections. The forming projections may be integral with or secured to the body portion. At one end, the body portion may comprise a recess, outboard of the aperture for the shaft. The recess may be bounded by a peripheral wall. Located within the recess may be a rebate defining the datum position. A datum key may be locatable at least partially within the rebate.

The driving means, e.g. gear or spur gear, may comprise a rebate to receive the or a datum key to define a spur gear datum position. Preferably, the driving means, e.g. gear or spur gear, comprises and extension, shaped to engage the or a recess on the tool. The driving means, e.g. gear or spur gear, may comprise an interrupted extension, the interruption(s) being shaped to receive an end of the or a datum key.

A further aspect of the invention provides a method of manufacturing rolling apparatus, the method comprising:
  a) providing a blank tool having a cylindrical periphery and a central aperture for receiving a shaft;
  b) determining a tool datum position;
  c) forming a cold rolling pattern on the cylindrical periphery;
  d) securing a driving means to one end of the tool such that a driving means datum position is aligned with the tool datum position.

The method may further comprise using the tool datum position to define a cold rolling pattern datum position, which is preferably utilised to provide an alignment position for the cold rolling pattern.

There is a further provided a tool for cold rolling, the tool having a cylindrical profile, a central aperture for receiving a shaft and at one end a rebate, located or locatable within the rebate is a key to establish a datum position, the key also being received or receivable in driving means secured or securable to the end of the tool.

It has been found that by referencing to the forming pattern and the driving means to a datum position a more accurate pattern registration is afforded the process and less damage may be suffered by the rolls and/or drive means in use.

Preferably the aperture defines a circular portion and an elongate radial portion, the shaft received or receivable therein being complementarily shaped thereto so as to be able to cause rotation of the tool in use.

Yet another aspect of the invention provides a sheet material, for example a formed sheet material, e.g. formed by a tool or a pair of tools as described above. The sheet material preferably comprises a pattern formed on or in a first portion or region thereof and indicia or a second pattern formed on or in a second portion or region thereof. Additionally or alternatively, the sheet material may comprise a first portion or region that is cold worked and a second portion or region that is embossed. The indicia or second pattern or second portion or region may be embossed such that the indicia or second pattern protrudes out of the plane of the sheet material, for example a neutral plane thereof.

The indicia or second pattern preferably provides a visual and/or machine readable indication of the alignment and/or identification of tools, e.g. opposed tools, used to form the sheet material. For example, the indicia or second pattern may comprise a predetermined pattern configured specifically to enable rapid and/or simplified detection of misalignment between the tools. In some embodiments, the indicia or second pattern is distorted if the tools are misaligned and/or the degree of distortion of the indicia or second pattern or embossing corresponds to the degree of misalignment of the tools. Additionally or alternatively, at least a portion of the indicia or pattern may be small or microscopic, e.g. visible only using a magnifying or looking glass or microscope. In one or some embodiments, the indicia or second pattern is on a flat, e.g. unformed, surface of the sheet material and/or is at least partially (e.g. entirely) surrounded or encircled or bound or confined by the pattern. For example, the pattern may comprise one or more interruptions and/or the indicia or second pattern may be formed in or at one or more or each of the interruptions.

The pattern preferably comprises one or more projections, which may be arranged in an array and/or may be on one, preferably both, of its major surfaces, for example thereby defining an effective thickness or amplitude, e.g. defined between the peaks of the projections on each side of the sheet material. The pattern may comprise projections or peaks and/or depressions in or on one or both major surfaces of the sheet material. One or more or each of the depressions on one of the major surfaces may have a corresponding projection or peak on the other of the major surfaces or vice versa. In embodiments, the pattern comprises projections in or on one or both major surfaces of the sheet material, for example each projection having a corresponding depression on the other or opposite major surface of the sheet material. The sheet material preferably comprises a central or neutral plane, for example corresponding to a plane or a central plan of the sheet material prior to forming. Projections formed on a first major surface of the formed sheet material may be formed on a first side of the central or neutral plane and/or projections formed on a second major surface, e.g. opposite the first major surface, of the formed sheet material may be formed on a second side of the central or neutral plan, e.g. opposite the first side. Similarly, depressions formed on the first major surface, which may correspond to projections formed on the second major surface, may also be formed on or pass through to the first side of the central or neutral plane and/or depressions formed on the second major surface, which may correspond to projections formed on the first major surface, may also be formed on or pass through to the first side of the central or neutral plane.

The pattern may comprise a plurality of rows and/or columns, e.g. rectilinear and/or helical rows and/or columns, of projections. The projections and depressions, e.g. the pattern or array, may be configured and/or distributed such that lines drawn on a surface of the material between adjacent rows of projections and depressions are not rectilinear.

Each projection is preferably plastic strain hardened, for example having been formed by deforming the sheet material locally, e.g. to leave a corresponding depression at the opposite face of the material.

The sheet material may comprise steel, for example, mild steel and may be galvanised. Alternatively, the sheet material may comprise any other material, preferably but not necessarily one that is capable of strain hardening and/or plastic deformation.

The sheet material may comprise a profile or shaped or bent cross-section such as a channel section or the like for use as a, or as part of a, partition or channel stud. The pattern and/or indicia or second pattern may be formed over all or part of the shaped section. Preferably, the indicia or second pattern is formed in or on a flat, e.g. unformed, surface of the sheet material, e.g. that is devoid of any bends or folds.

Another aspect of the invention provides a profile or beam or article having a shaped cross-section, which profile or beam or article may have a shaped cross-section comprising a sheet material as described above. The profile or beam or article may comprise a first portion having peaks and depressions, which may be formed by cold working the sheet material. The profile or beam or article may comprise a second portion, which may be at an interruption of the peaks and depressions. The second portion may comprise one or more raised or rebated regions formed by embossing, e.g. embossing the sheet material such that the regions protrude or are rebated out of the plane of the sheet material, for example a neutral plane thereof. The second portion preferably provides indicia.

The pattern may be continuous, for example the projections and/or depressions may together provide a continuous pattern. The pattern may comprise a continuous region of peaks and depressions, which may be so located that the surface of the sheet material has no rectilinear lines. The pattern and indicia preferably together provide a repeat pattern, for example which may be formed by roll forming tools.

Yet another aspect of the invention provides a method for determining the quality of a formed sheet material, for example a method for or of quality control, the method comprising determining using the indicia whether the tools are aligned.

A further aspect of the invention provides a quality control method comprising forming using a pair of tools a pattern on or in a first portion of a sheet material, forming using the tools, e.g. the same pair of tools, indicia on or in a second portion of the sheet material and checking or observing or assessing or determining, e.g. using the indicia, whether the tools are aligned.

Yet further aspects of the invention provide a formed sheet material, a tool, a pair of tools and an apparatus for use, e.g. specifically adapted for use, in the aforementioned method.

BRIEF DESCRIPTION OF SEVERAL VIEWS OF THE DRAWINGS

Embodiments of the invention will now be described by way of example only with reference to the accompanying drawings in which:

FIG. 3 is a section view along line A-A of FIG. 1;

FIG. 4 is a plan view of the radial hole in the tool of FIG. 1;

FIG. 5 is a perspective view of the marking insert for incorporation into the forming tool of FIGS. 1 to 3;

FIG. 6 is a side view of the marking insert of FIG. 4;

FIG. 7 is a section view along line B-B of FIG. 5;

FIG. 8 is a side view of a forming tool for cooperation with the tool of FIG. 1;

FIG. 10 is a perspective view of a first end of the tool of FIGS. 1 and 9;

FIG. 11 is a perspective view of a second end of the tool of FIGS. 1 and 9;

FIG. 12 is a perspective view of an aligned pair of tools according to an embodiment of the invention.

DETAILED DESCRIPTION OF THE INVENTION

Figure 1:
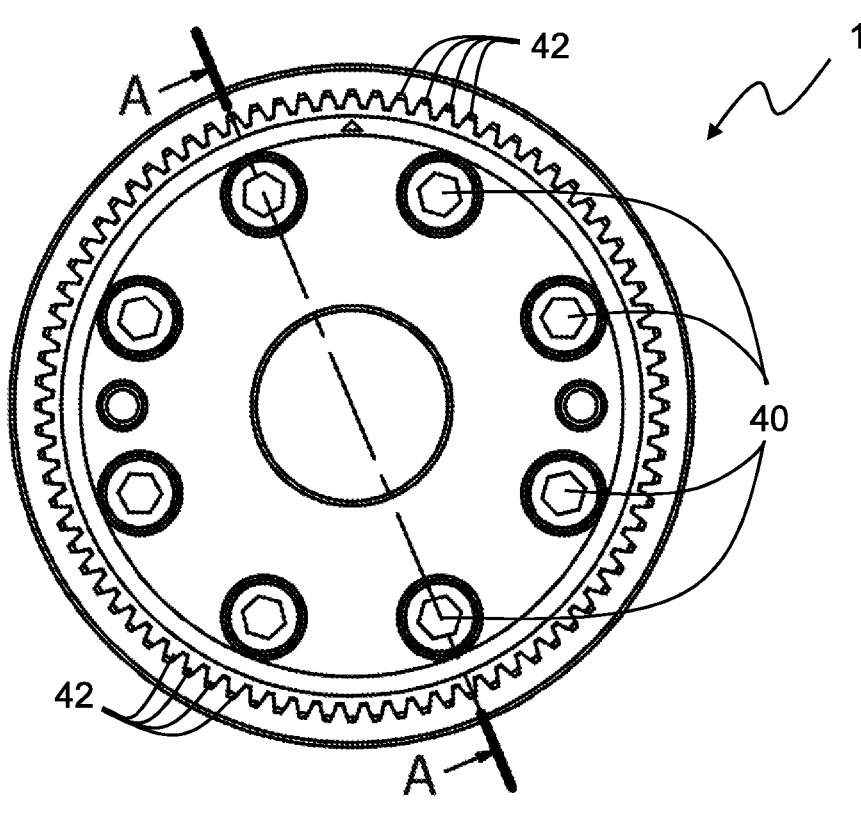
FIG. 1 is an end view of a forming tool according to one embodiment of the invention.
Figure 2:
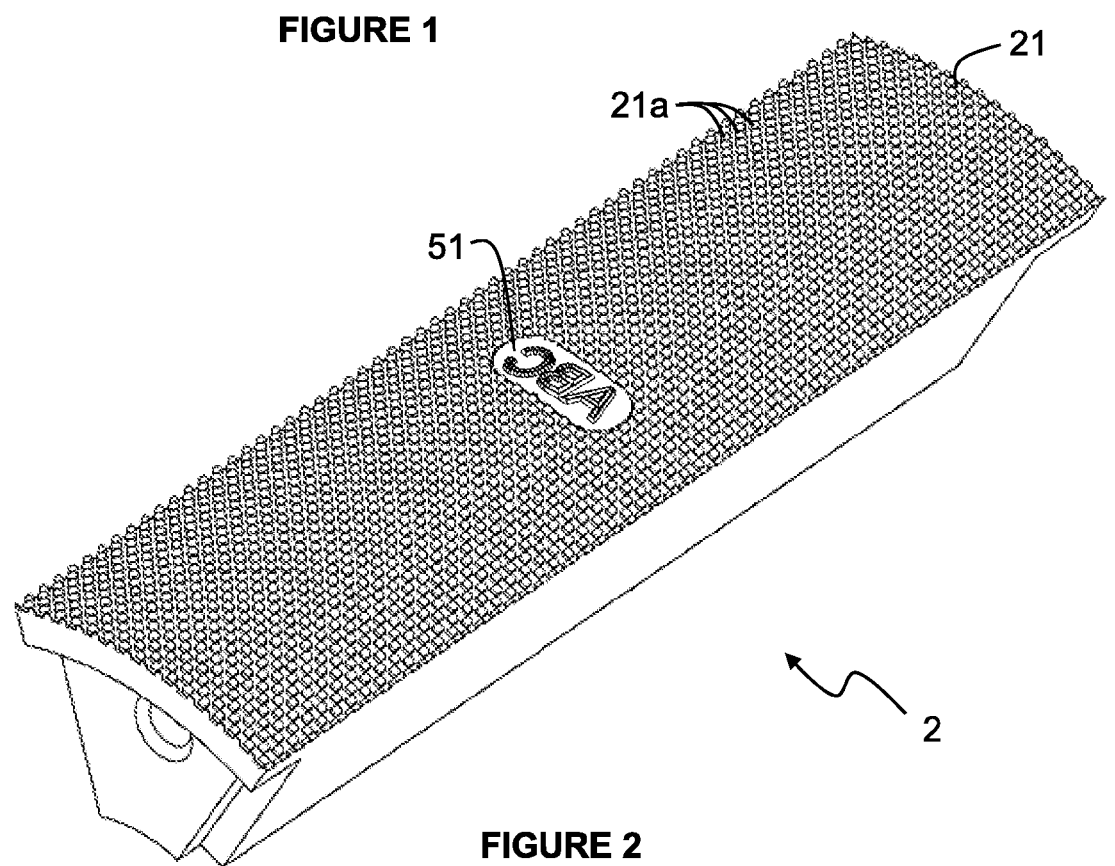
FIG. 2 is a perspective view of a segment of the forming drum of the forming tool of FIG. 1.
Figure 9:
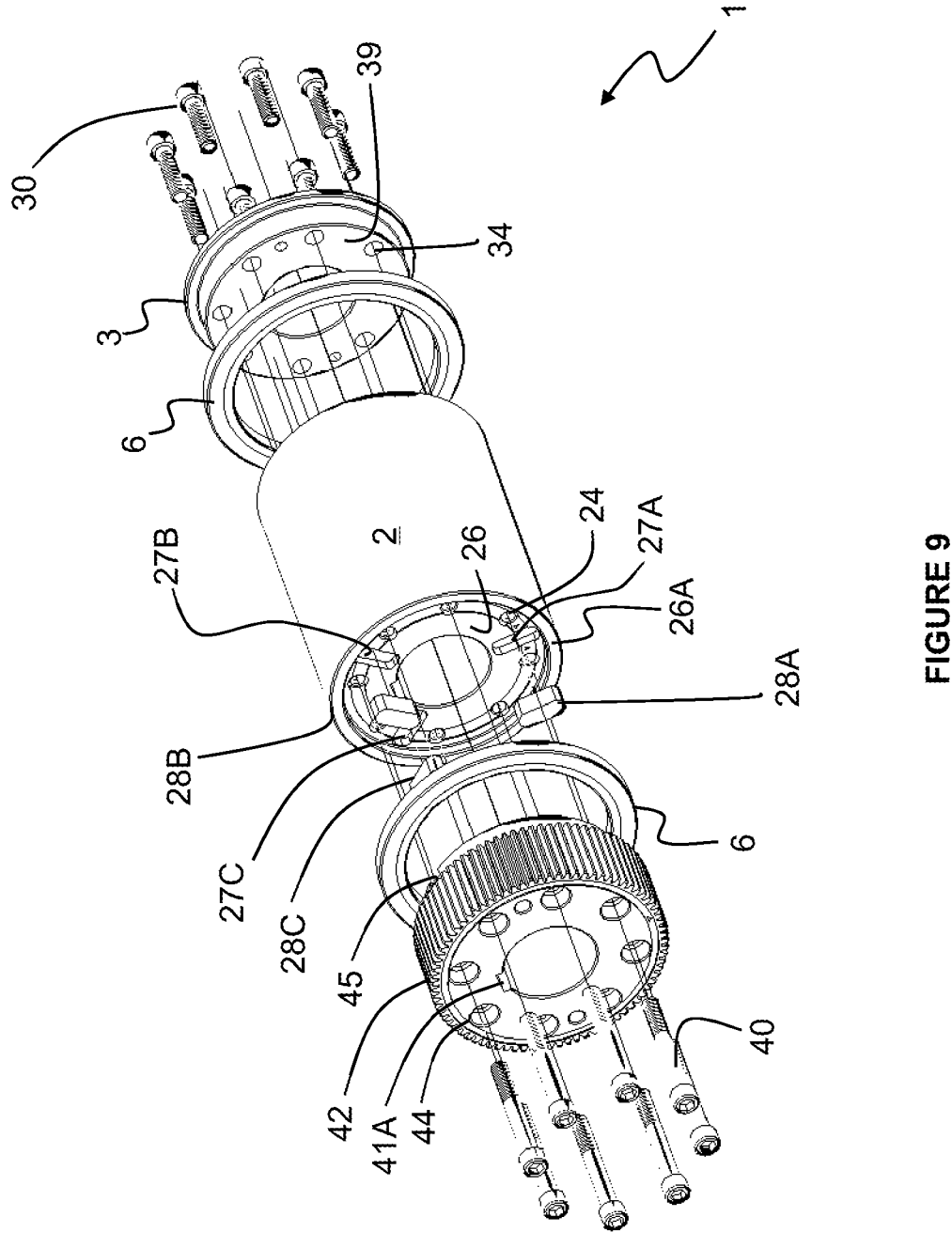
FIG. 9 is an exploded view of the forming tool of FIG. 1 illustrating an exemplary driving assembly in more detail.

Referring now to FIGS. 1 to 4, there is shown a forming tool 1, which is a cylindrical roll former 1 in this embodiment, for cold roll forming a sheet material. The tool 1 includes a central forming drum 2, first and second end parts 3, 4, an insert 5, a pair of locating rings 6 and locking mechanism 7 for releasably securing the insert 5 within the forming drum 2.

The forming drum 2 is in the form of a hollow cylinder or roll that provides a substrate on which a first profiled forming surface 21 is incorporated on its outer circumferential surface. In this embodiment, the first profiled forming surface 21 incorporates a pattern of projections 21a arranged in an array having a plurality of rows and columns. The forming drum 2 includes at least one, and preferably a pair of, coaxial radial holes 22, 23 located preferably centrally along its longitudinal axis, the hole 22, 23 or each of which includes a counterbore 22a, 23a extending inwardly from the outer circumference of the forming drum 2. The counterbores 22a, 23a are substantially rectangular in plan with rounded corners, as shown more clearly in FIG. 4. The counterbore 23a of one of the radial holes 23 includes one rounded corner 20a having a larger diameter than the other rounded corners of the counterbore 23a. The holes 22, 23 and corresponding counterbores 22a, 23a need not be of the same dimensions. The holes 22, 23 and corresponding counterbores 22a, 23a need not be coaxial.

The forming drum 2 also includes eight longitudinal through holes 24 extending parallel to the axis of the forming drum 2 and spaced equally from and about the longitudinal axis. Each end of each longitudinal hole 24 is tapped with a female thread for cooperation with a respective threaded bolt 30, 40. Each axial end of the forming drum 2 includes a recess 25, 26 for receiving a portion of a respective one of the first and second end parts 3, 4.

The first end part 3 is in the form of a substantially cylindrical disc with a central hole 31, a radial flange 32 on a first side thereof and eight holes 34 extending through the thickness of a central portion of the disc with positions corresponding to those of the through holes 24 in the forming drum 2. Each of the through holes 34 includes a counterbore 34a on the first side of the first end part 3 for accommodating the head of a respective bolt 30. The second side of the first end part 3 is received within a first of the end recesses 25 of the forming drum 2 and secured thereto by eight bolts 30 extending through the through holes 34 of the first end part 3 and engaging the female threads in the through holes 24 of the forming drum 2 with one of the locating rings 6 captivated between the end of the forming drum 2 and the radial flange 32.

The second end part 4 is in the form of a hollow cylindrical spur gear member 4 with an axial hole 41 therethrough, a plurality of gear teeth 42 extending outwardly therefrom, a radial undercut providing a shoulder 43 on a first side thereof and eight through holes 44 with positions corresponding to those of the through holes 24 in the forming drum 2. Each of the through holes 44 includes a counterbore 44a on a second side of the second end part 4, opposite the first side, for accommodating the head of a respective bolt 40. The undercut, first side 43 of the second end part 4 is received within a second of the end recesses 26 of the forming drum 2 and secured thereto by eight bolts 40 extending through the through holes 44 of the second end part 4 and engaging the female threads in the through holes 24 of the forming drum 2 with the other locating ring 6 captivated between the gear teeth 42 of the second end part 4 and the end of the forming drum 2.

As shown more clearly in FIGS. 5 to 7, the insert 5 is in the form of a substantially rectangular block with rounded vertical corner edges 50, 50a to provide an upper forming face 51 that is substantially rectangular in plan with rounded edges. One of the corner edges 50a has a slightly larger radius than the others for cooperation with the rounded corner 20a of the counterbore 23a within which the insert 5 is to be received to ensure proper orientation.

The base surface of the forming face 51 of the insert 5 is curved to provide a constant depth recess in the circumference of the forming drum 2 when the insert 5 is received therein. The upper forming face 51 includes forming edges 52 that delineate a brand logo in this embodiment. The forming edges 52 delineate the outline of the letters of the logo with the letters themselves appearing as depressions 52a within the delineated outline or between the forming edges 52.

The insert 5 also includes on a first side thereof a locking recess 53 with a flat ledge 54 that is substantially parallel to the forming face 51 and a tapered surface 55 opposite the flat ledge 54 to provide a wide mouthed locking recess 53 that tapers to a narrow base 56 skewed toward the flat ledge 54. The insert 5 also includes a cutout 57 in a second side thereof, opposite the first side, and in the bottom of the insert 5. The cutout 57 is inclined, to provide a lead-in edge, in the same direction as the tapered surface 55 of the locking recess 53.

The locking mechanism 7 includes a locking pin 70 and a compression spring 71, both of which are captivated within one of the through holes 24 in the forming drum 2 between one of the bolts 40 and the locking recess 53 of the insert 5. As shown more clearly in FIG. 3, the insert 5 is received within the counterbore 23a of one of the radial holes 23 of the forming drum 2 with the locking recess 53 facing the second end part 4. The locking pin 70 has a first, rounded end that is received within the locking recess 53 and engages the tapered surface 55. The locking pin 70 is biased by the spring, which is compressed between the end of the bolt 40 and a second, flat end of the locking pin 70. The provision of a biased locking pin 70 that engages a tapered surface 55 provides retaining forces along both the axis of the insert 5 and the axis of the locking pin 70.

With the insert 5 received and retained with the counterbore 23a of the radial hole 23 of the forming drum 2, the forming face 51 is substantially contiguous with and adjacent the first profiled forming surface 21, albeit recessed slightly with respect thereto. Thus, as the tool 1 forms a sheet material, both the indicia and a portion of the pattern are formed simultaneously.

Turning now to FIG. 8, there is shown the forming drum 8 of a second tool, which is also in the form of a cylindrical roll former and is substantially similar to the forming drum 2 of the first tool 1, wherein like features are depicted with like reference numbers with the prefix 2 replaced with the number 8. The second tool assembly includes the forming drum 8, first and second end parts, 3, 4, locating rings 6 and a locking mechanism 7 assembled in a similar manner to that described above in relation to the first tool 1. The radial hole 83 is adapted to receive an insert (not shown), which may be a blank having a featureless forming surface for cooperating with the forming edges 52 of the insert 5 of the first tool 1 to mark a sheet material with indicia.

Alternatively and in accordance with one aspect of the present invention, the insert (not shown) may include forming edges that cooperate with the forming edges 52 of the insert 5 to provide the indicia. For example, the forming edges of the further insert may comprise forming edges that are received by and/or register with the depressions 52a within the delineated outline or between the forming edges 52. It will be appreciated by those skilled in the art that with such an arrangement, any misalignment between the tools 1, 8 would be readily visible by a distortion of the logo.

In further preferred alternative embodiments, the forming edges 52 may delineate indicia which is or are configured to be machine readable, for example in the form of one or more bar codes and/or quick response (QR) codes. In such embodiments, even minor distortion resulting from a misalignment between the tools 1, 8 may be detected using computerised scanning and processing. In fact, it is envisaged that the indicia may be selected such that the nature of the misalignment may be discernable from the extent and nature of the distortion. The use of QR codes or similar types of indicia could form the basis of such an arrangement.

The tools 1, 8 are rotatably mounted within an apparatus (not shown) a predetermined distance apart and interconnected by their respective driving means (not shown), which drives the gear teeth 42 of the second end part 4 to ensure that they contra-rotate at the same speed. Rotation of the tools 1, 8 causes the array of projections 21a on the first tool 1 to register and extend into gaps between the projections (not shown) on the other tool 8.

In use, the tools 1, 8 cooperate to form a pattern of projections and depressions in a sheet material fed between them, while the locating rings 6 retain the sheet material between them. As the tools 1, 8 rotate, the projections 21a on one tool 1 urge portions of the sheet material into gaps between the projections (not shown) on the other tool 8, thereby defining an effective thickness or amplitude defined between the peaks of the projections on each side of the sheet material. In this embodiment, the material is sheet steel and the forming of the pattern of projections and depressions results in plastic strain hardening of the sheet material, having been formed by deforming the sheet material locally, as explained in more detail in WO2009/063154 (and/or one of GB2450765A and EP0891234A).

In addition, as the tools 1, 8 form the pattern of projections and depressions in the sheet material, the forming edges 52 of the insert 5 bear against the blank (not shown) in the other tool 8 to emboss the indicia on the sheet material. Alternatively, where the insert (not shown) in the other tool includes further forming edges, these may cooperate with the forming edges 52 of the insert 5 to emboss or otherwise form the indicia.

Turning now to FIGS. 9 to 12, each of the recesses 25, 26 (only one of which is shown) of the forming drum 2 is circular in plan and bound by an annular wall 26A. Equispaced about the recess 26 and inboard of the annular wall 26A, are a series of rebates 27A, 27B, 27C for receiving an end of respective datum keys 28A, 28B, 28C. The shoulder 43 of the spur gear member 4 includes three interruptions 45 (only one of which is shown) which are complementarily shaped to receive the other end of the datum keys 28A, 28B, 28C.

When engaged, the interrupted shoulder 43 extends through the locating ring 6 and lies against the circular recess 26 and is bounded by the annular wall 26A with the datum keys 28A, 28B, 28C partly received in the interruptions 45.

The central hole 31 of the first end part 3 includes a keyway 31A and the central hole 41 of the spur gear member 4 includes a corresponding keyway 41A aligned with the keyway 31A of the first end part 3 when the tool 1 is in an assembled condition, thereby to receive a keyed driving shaft (not shown).

In order to fabricate a set of tools 1, 8 according to the invention, the following process is followed.

Firstly, it is determined what sort of patterned and corresponding patterning process is required. The type of tooth form, the height of the tooth, inter-tooth pitch (in rows and columns) are all important characteristics to be considered when seeking to manufacture a particular patterned sheet material. Thus, once the tooth form is determined, a blank roll 2 is provided. One of the recesses (e.g. 26) is used to determine a roll datum position DP. The tooth form is then provided on the outer periphery 21 of the forming drum 2, for example, by one or more of cutting, milling, grinding, etching and so on, but using the datum position DP to determine the starting position for the forming operation.

As shown is FIG. 12, the spur gear 4 is also aligned to the datum position DP to provide a gear datum alignment position $DA_G$ on both the gear (e.g. the spur gear 4 of the first tool 1) and in the pinion $DA_p$ (e.g. the spur gear 4 of the second tool 8).

In this way it is clear that the pattern formed on the rolls 1, 8 and the position of the spur gears 4 are aligned to a single defined point on each roll 1, 8.

Moreover, once the desired patterning process has been established, the spur gear form is calculated according to equations (1) to (3):

$$d_{TP}=162 \text{ mm}$$

In one exemplary embodiment, the sheet material to be rolled is 0.6 mm thick (i.e. g=0.6 mm) steel.

In this instance, the spur gear 4 has the following characteristics, (setting k=0.1 and $d_{TP}$:$d_0$=1);

DPCD=162–(0.6+0.1)

=161.3 mm

N=80

P=0.5

Addendum (A)=2

Dedendum (D)=2.3

Tooth thickness (T)=3.14

Pressure angle=20°

The shaft (not shown) extending through the first tool 1 is driven by a motor at a first 'jog' speed which causes rotation of that tool 1 and, through the action of the intermeshing spur gears 4, caused contra-rotation of the other roll 8.

With the rolls 1, 8 being driven at a first speed, the sheet material is fed through the nip and onto the subsequent forming rollers. Once the material is fed through all of the stations, the rolls 1, 8 are driven at their faster running speed and the process of manufacturing commences.

It is of note that once the material to be patterned passes into the nip, the rolls 1, 8 are separated slightly, thereby causing separation of the spur gears 4. This separation ensures that the teeth of the gears do not contact at the previous line of action and thus are not drivingly engaged. At this point, the rolls 1, 8 are driven by the action of the drive means direct to the shafts.

Figure 13:
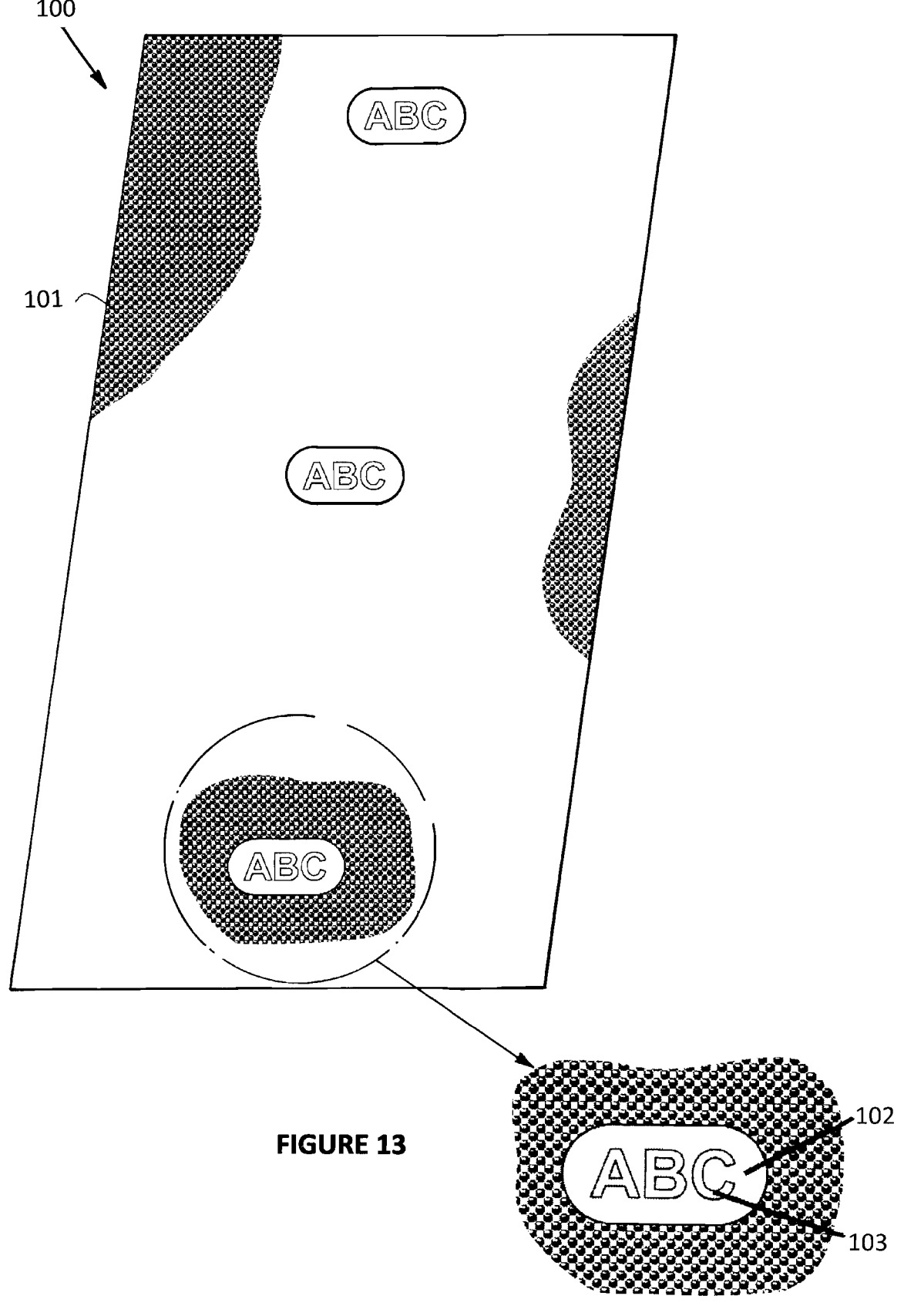
FIG. 13 is a top view of a sheet material according to an embodiment of the invention.

Referring now to FIG. 13, there is shown a sheet material 100 comprising a cold worked region 101 in which a pattern of projections is formed on both major surfaces, each projection having a corresponding depression on the opposite major surface. The pattern is formed such that lines drawn on a surface of the formed sheet material between adjacent rows of projections and depressions are not rectilinear. The sheet material 100 also includes a series of interruptions 102 in the cold worked pattern on which is formed indicia 103.

It will be appreciated by those skilled in the art that several variations to the aforementioned embodiments are envisaged without departing from the scope of the invention. For example, other sheet materials may be formed by the present invention, which may, but need not, comprise steel or metal or even plastics material. The forming edges 52 may be configured to delineate or define any indicia, such as alphanumeric indicia, one or more images or a unique identifier relating to the tool or a pair of tools or a forming machine or a manufacturer, e.g. a sheet forming manufacturer and/or tool manufacturer. Moreover, the locking mechanism 7 need not include a spring-biased locking pin 70, e.g. it may comprise any suitable locking arrangement such as a ball and detent arrangement or even a bayonet-type locking mechanism or any other type of locking mechanism or means. Several other variations will be appreciated from the disclosure herein or recognised readily by the skilled person.

It will also be appreciated by those skilled in the art that any number of combinations of the aforementioned features and/or those shown in the appended drawings provide clear advantages over the prior art and are therefore within the scope of the invention described herein.

The invention claimed is:

1. A metal sheet material having a first major surface and a second major surface, the metal sheet material comprising a pattern of projections and depressions formed on both major surfaces and on or in a first portion or region of the metal sheet material and indicia formed on or in a second portion or region of the metal sheet material at an interruption in the pattern of projections and depressions, wherein the indicia has a form and the form of the indicia is usable to provide an indication of an alignment of tools used to form the pattern of projections and depressions, wherein the indicia comprise a plurality of individual alphanumeric characters at the interruption.

2. The metal sheet material according to claim 1, wherein the second portion or region is surrounded by the first portion or region.

3. The metal sheet material according to claim 1, wherein one or more or each projection formed on one or each major surface of the metal sheet material corresponds to a depression on the other major surface thereof.

4. The metal sheet material according to claim 1, wherein the indicia is formed on a flat surface of the metal sheet material.

5. The metal sheet material according to claim 1, wherein the indicia protrude out of the plane of the metal sheet material.

6. The metal sheet material according to claim 4, wherein the indicia protrude out of the plane of the metal sheet material.

7. The metal sheet material according to claim 1, wherein a degree of distortion of the indicia corresponds to a degree of misalignment of the tools.

8. The metal sheet material according to claim 7, wherein at least a portion of the indicia provides a machine-readable indication of the alignment of tools used to form the metal sheet material and wherein the degree of distortion of the form of the indicia corresponds to the degree of misalignment of the tools.

9. The metal sheet material according to claim 1, wherein the pattern of projections and depressions are arranged in an array.

10. The metal sheet material according to claim 1, wherein the pattern of projections and depressions comprises a plurality of rows and/or columns.

11. The metal sheet material according to claim 10, wherein the pattern of projections and depressions is configured and distributed such that lines drawn on a surface of the metal sheet material between adjacent rows of projections and depressions are not rectilinear.

12. A metal sheet material having a first major surface and a second major surface, the metal sheet material comprising a pattern of projections and depressions formed on both major surfaces and on or in a first portion or region of the metal sheet material and indicia formed on or in a second portion or region of the metal sheet material at an interruption in the pattern of projections and depressions, wherein the indicia has a form and the form of the indicia is usable to provide an indication of an alignment of tools used to form the pattern of projections and depressions, wherein the indicia comprise a plurality of alphanumeric indicia, wherein the indicia is a name or a logo.

13. A profile or beam or article having a shaped cross-section and comprising the metal sheet material according to claim 1.

14. A metal sheet material having a length and a width, a first major surface and a second major surface, the metal sheet material comprising a pattern of projections and depressions formed on both major surfaces and on or in a first portion or region of the metal sheet material, the pattern of projections and depressions extending across the length and width of the metal sheet material and indicia formed on or in a second portion or region of the metal sheet material at an interruption in the pattern of projections and depressions such that the indicia is remote from any of the projections or depressions providing said pattern of projections and depressions, wherein the interruption is an area where there are no projections or depressions wherein the indicia has a form and the form of the indicia is usable to provide an indication of an alignment of tools used to form the pattern of projections and depressions.

15. The metal sheet material of claim 14, wherein the indicia is formed on a flat surface of the metal sheet material.

16. The metal sheet material of claim 14, wherein the indicia protrude out of the plane of the sheet material.

17. The metal sheet material of claim 14, wherein the indicia comprise alphanumeric indicia.

18. A profile or beam or article having a shaped cross-section and comprising the metal sheet material according to claim 14.

19. A metal sheet material having a length and a first major surface and a second major surface, the metal sheet material comprising a pattern of projections and depressions formed on both major surfaces and on or in a first portion or region of the metal sheet material, a second portion or region where there are no projections or depressions to provide a first interruption in the pattern of projections and depressions, and a third portion or region where there are no projections or depressions to provide a second interruption in the pattern of projections and depressions and first indicia formed on or in the second portion or region of the metal sheet material and second indicia formed on or in the third portion or region of the metal sheet material, wherein the first interruption and the second interruption are successive interruptions along the length of the sheet material with projections and depressions between the first interruption and the second interruption and the first indicia and second indicia are the same and have a form and the form of the first and second indicia is usable to provide an indication of an alignment of tools used to form the pattern of projections and depressions.

20. The metal sheet material of claim 19, wherein the first indicia and the second indicia are alphanumeric indicia.

21. A profile or beam or article having a shaped cross-section and comprising the metal sheet material according to claim 19.

* * * * *